United States Patent
Kunie (10) Patent No.: US 7,565,510 B2
(45) Date of Patent: Jul. 21, 2009

(54) MICROPROCESSOR WITH A REGISTER SELECTIVELY STORING UNALIGNED LOAD INSTRUCTIONS AND CONTROL METHOD THEREOF

(75) Inventor: Shuichi Kunie, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 46 days.

(21) Appl. No.: 11/409,996

(22) Filed: Apr. 25, 2006

(65) Prior Publication Data

US 2006/0259746 A1 Nov. 16, 2006

(30) Foreign Application Priority Data

May 10, 2005 (JP) ............................. 2005-137750

(51) Int. Cl.
G06F 9/30 (2006.01)
G06F 9/00 (2006.01)

(52) U.S. Cl. ...................... 712/204; 712/225; 712/210

(58) Field of Classification Search .................. 712/220, 712/204, 210, 225
See application file for complete search history.

(56) References Cited

U.S. PATENT DOCUMENTS

| | | | | |
|---|---|---|---|---|
| 5,394,529 A | * | 2/1995 | Brown et al. ................. | 712/240 |
| 5,649,136 A | * | 7/1997 | Shen et al. .................... | 712/244 |
| 5,835,745 A | * | 11/1998 | Sager et al. ................... | 712/215 |
| 6,085,289 A | * | 7/2000 | Thatcher et al. .............. | 711/118 |
| 6,202,126 B1 | * | 3/2001 | Van Doren et al. ........... | 711/118 |
| 6,978,359 B2 | * | 12/2005 | Miyamori ..................... | 712/204 |
| 7,340,495 B2 | * | 3/2008 | Buxton et al. ................ | 708/209 |
| 2003/0120889 A1 | * | 6/2003 | Roussel et al. ............... | 711/201 |
| 2009/0037702 A1 | * | 2/2009 | Matsuyama et al. .......... | 712/225 |

OTHER PUBLICATIONS

Shen, John Paul, and Mikko H. Lipasti., Modern Processor Design: Fundamentals of Supercalar Processors, Beta ed. McGraw-Hill, pp. 201-204.

Shen, John Paul, and Mikko H. Lipasti., Modern Processor Design: Fundamentals of Supercalar Processors, Beta ed. McGraw-Hill, pp. 201-204, Date: Jul. 22, 2002.

* cited by examiner

*Primary Examiner*—Eddie P Chan
*Assistant Examiner*—Idriss N Alrobaye
(74) *Attorney, Agent, or Firm*—McGinn IP Law Group, PLLC (57) ABSTRACT

A load/store unit includes a Top register for storing a value retained before loading to a load destination register and a saved register capable of storing data retained to the Top register. When an unaligned instruction evaluation unit determines that a load instruction issued from a instruction decode unit is an unaligned instruction, data stored to the Top register are stored to the saved register in order to make the Top register available to subsequent load instructions issued from the instruction decode unit.

10 Claims, 8 Drawing Sheets

MICROPROCESSOR WITH A REGISTER SELECTIVELY STORING UNALIGNED LOAD INSTRUCTIONS AND CONTROL METHOD THEREOF

BACKGROUND OF THE INVENTION

1. Field of the Invention

The present invention relates to an architecture of a microprocessor, and particularly to a microprocessor provided with a non-blocking load feature.

2. Description of Related Art

One of primary objects for microprocessor developers is to improve instruction processing speed of a microprocessor. Using cache memory is well known as a technique to improve processing speed of a microprocessor. The cache memory is used to eliminate a difference between processing speed of a microprocessor and data transfer rate of a main memory such as DRAM.

However if data to be used in an operation is not stored in a cache memory, data must be transferred from a low-speed main memory that resides outside a processor. Where data to be used in a microprocessor does not exist in a cache memory on a cache access, it is referred to as a "miss hit" or a "cache miss". When a cache miss occurs, the cache memory cannot be accessed during a data transfer from the main memory to the cache memory, accordingly an execution of subsequent load instructions and store instructions, not only an execution of the load instruction the cache miss is occurred in, is stopped. In a microprocessor that performs pipeline process, a cache miss makes a pipeline stall, thereby causing to reduce its performance.

A microprocessor provided with non-blocking load feature for avoiding a generation of pipeline stall due to such a cache miss is widely known. In a case when a preceding load instruction encounters a cache miss, the non-blocking load feature temporarily saves the instruction the cache miss is generated therein, in order to allow subsequent load instructions to continue accessing a cache memory (See Shen, John Paul, and Mikko H. Lipasti., Modern Processor Design: Fundamentals of Superscalar Processors, Beta ed. McGraw-Hill, 2002, pp. 201-204).

On the other hand a microprocessor is to handle data by a unit of a given data length, where most of the current processors define this processing unit as 32 bits (4 bytes) or 64 bits (8 bytes). The processing unit is defined as a "word". A unit of 32 bits is referred to as 1 word, while a unit of 64 bits is referred to as double words hereinafter. It is possible to achieve high-speed processing by aligning data length of peripheral devices such as a cache memory according to a data unit of a microprocessor. For example a line width of a cache memory is configured to be 1 word or a multiple thereof, so that in one cache access, 1 word or a double words data can efficiently be loaded. Further, a unit of data for loading and storing is either 8 bits (1 byte) or 16 bits (2 bytes or a half word), enabling to access a cache memory or a main memory in the same way as loading by a word (hereinafter referred to as word load) and loading by a double words (hereinafter referred to as double word load).

Storing a data less than 1 word together with other data in 1 word unit could result in the data stored straddling a boundary for 1 word (hereinafter referred to as a word boundary) or a line boundary for a cache memory (hereinafter referred to as a cache line boundary). The data stored straddling a word boundary is hereinafter referred to as an unaligned data.

To align and load such an unaligned data, usually two cache accesses, two or more registers, and two or more logic operations are required. However MIPS (a registered trademark of MIPS Technologies, Inc.) instruction set, which is a major RICS (Reduced Instruction Set Computer) instruction set, is provided with instructions such as LWL (Load Word Left) instruction, LWR (Load Word Right) instruction, LDL (Load Double-word Left), and LDR (Load Double-word Right) instruction. By combining these instructions for execution, only two cache accesses are needed to load an unaligned data. This also promotes efficiency by using only one register.

Figure 7:
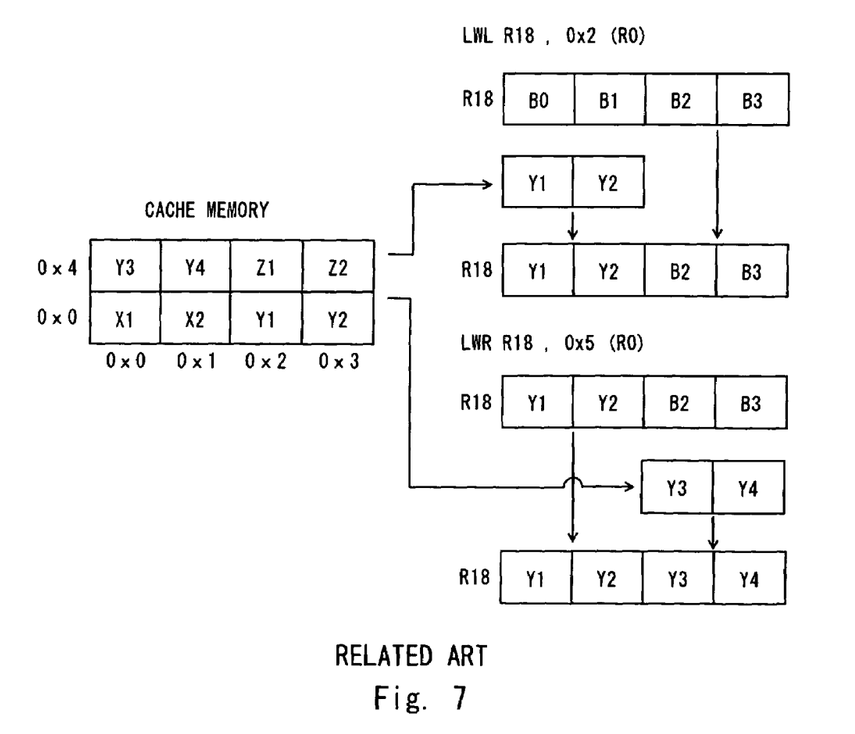
FIG. 7 is a view explaining an unaligned load instruction.

As an example, a case of loading an unaligned data using a LWL instruction and a LWR instruction is explained hereinafter in detail with reference to FIG. 7. FIG. 7 shows an operation of loading unaligned data (Y1 to Y4) from a cache memory where data are stored in big-endian format.

A mnemonic of a LWL instruction "LWL R18, 0×2 (R0)" is an instruction to store data from an effective address of a cache memory, which is obtained by adding an offset value 0×2 to a value of base register R0, to a word boundary in an area on the left of a load destination register R18. To be more specific, when assuming a value of a base register R0 to be 0×0, data Y1 and Y2, which are located at addresses from 0×2 specified by an effective address to a left word boundary 0×3, and data B2 and B3, which are originally stored in a target register R18, are merged and stored back to the register R18.

Further, a mnemonic of a LWR instruction "LWR R18 0×5 (R0)" is an instruction to store data from a word boundary of a cache memory to an effective address of a cache memory, which is obtained by adding an offset value 0×5 to a value of base register R0, in an area on the right of a load destination register R18. To be more specific, when assuming a value of a base register R0 to be 0×0, data Y3 and Y4, which are located at addresses from 0×5 specified by an effective address to a smaller address side of a word boundary 0×3, and data Y1 and Y2, which are originally stored in a target register R18, are merged and stored back to the register R18.

As described in the foregoing, for a MIPS instruction set, loading unaligned data (Y1 to Y4) can be achieved by executing LWL and LWR instructions that merges a data less than 1 word with an original data and loads the merged data. Similarly, executing LDL and LDR instructions enables to align and load double words data that are stored unaligned.

Aforementioned instructions such as LWL instruction, LWR instruction, LDL instruction, and LDR instruction for MIPS instruction set are referred to as unaligned load instructions. In other words, an unaligned load instruction is an instruction that reads a data less than 1 word or 1 double words from a cache memory and stores such data in a load destination register, as well as merging a data read from the cache memory with original data (merging data) retained by the load destination register and storing the merged data back to the load destination register.

Figure 8:
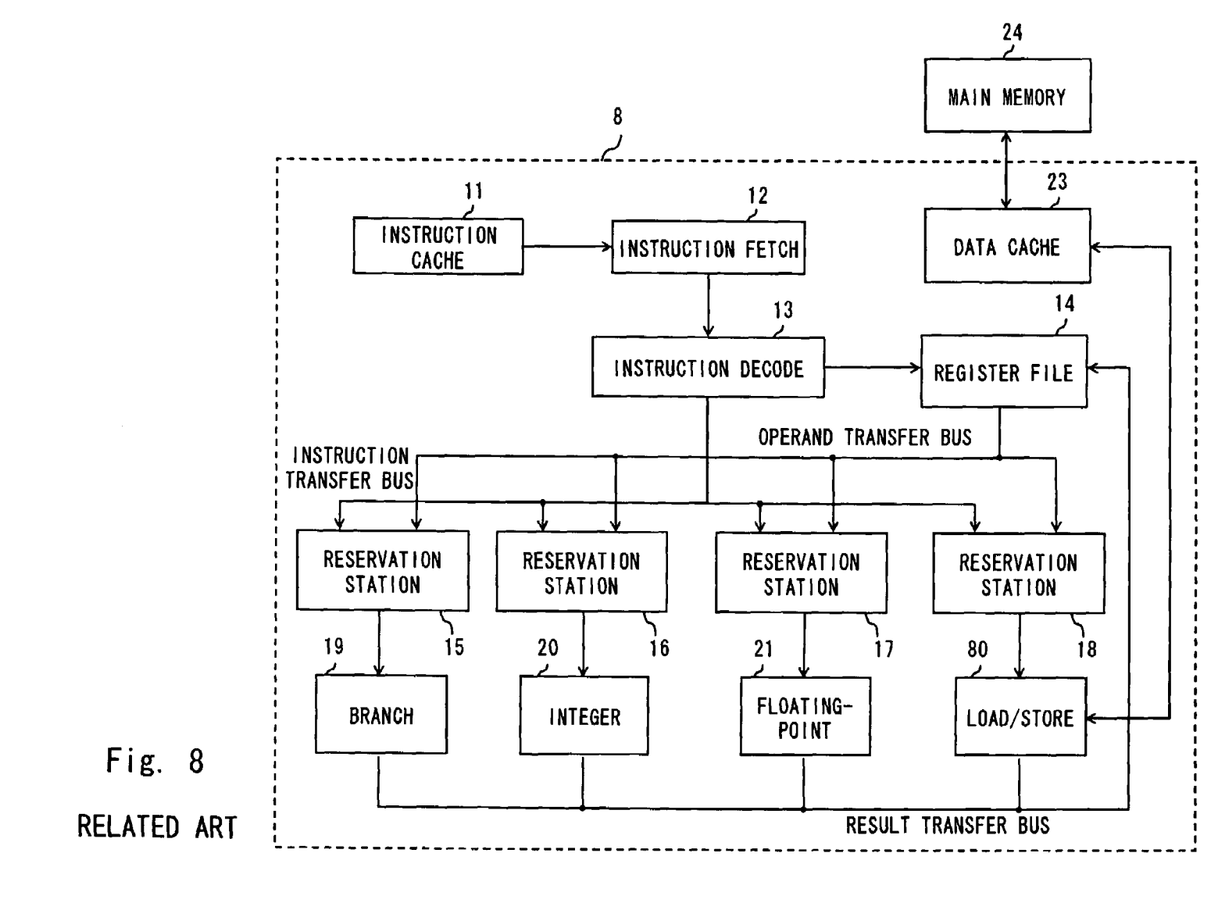
FIG. 8 is a block diagram of a microprocessor according to a conventional technique.
Figure 9:
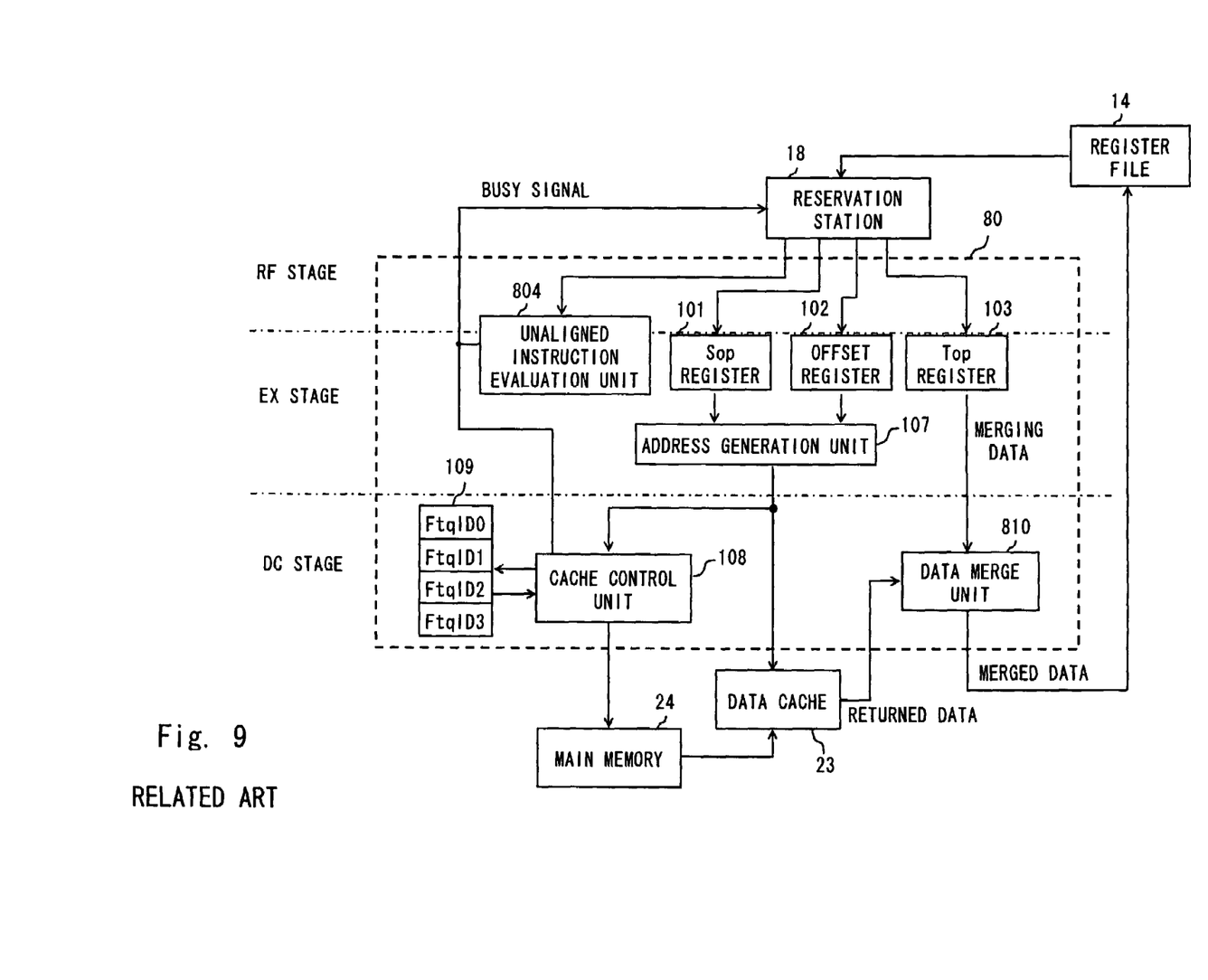
FIG. 9 is a block diagram of a load/store unit that is included in a microprocessor according to a conventional technique.

FIGS. 8 and 9 show configurations of microprocessors capable of executing unaligned load instructions and provided with a non-blocking load feature, according to a conventional technique. FIG. 8 is a view showing an overall configuration of a microprocessor 8.

An instruction fetch unit 12 provides an instruction cache 11 with a content of a program counter (not shown) and then loads an instruction to an instruction register (not shown). The instruction cache 11 is a cache memory for storing an instruction.

An instruction decode unit 13 decodes an instruction and issues the instruction to one of reservation stations 15 to 18, depending on types of the instruction. The instruction decode unit 13 provides a register file 14 with a register number assigned by an operand and then content of an operand register outputted from the register file 14 is stored to reservation stations 15 to 18.

If all operands are available in the reservation stations 15 to 18, an instruction is executed in execution units such as an integer arithmetic unit 20 and a load/store unit (LSU) 80.

Load instructions including an unaligned load instruction are executed in LSU 80. A configuration of LSU 80 for executing a load instruction is illustrated in FIG. 9.

When executing a load instruction in LSU 80, contents of the three instruction operands retained by the reservation station 18 are set to a Sop register 101, an offset register 102, and a Top register 103. Specifically, a base register value for generating an affective address of the cache memory is set to the Sop register 101. An offset value for calculating an effective address is set to the offset register 102. Further, a content stored in a load destination register, where a loaded data is stored thereto, before an execution of a load instruction is set to the Top register 103.

An address generation unit 107 adds values of the Sop register 101 and offset register 102 so as to generate an effective address of the data cache 23.

A cache control unit 108 refers to the effective address created by the address generation unit 107 and if the operation results in a cache miss, the cache control unit 108 saves the load instruction in a fetch queue 109. This enables subsequent load instructions to be executed without waiting for the data to be loaded from a main memory 24, thereby avoiding a generation of a pipeline stall. FIG. 9 shows a configuration that allows 4 instructions to be stacked in the fetch queue 109, so that even if 4 cache misses occur, subsequent instructions can still continue to access the data cache 23. In a case if cache misses are occurred exceeding the number of instructions that can be saved in a fetch queue 109, the cache control unit 108 outputs busy signals to the instruction decode unit 13 and reservation station 18, whereby subsequent instructions are aborted to be issued while the busy signals continues to being outputted.

When executing an unaligned load instruction such as above-mentioned LWL instruction and LWR instruction, a returned data from the data cache 23 is merged with merging data which is set to the Top register 103 in a data merge unit 810, and then the merged data is stored to a load destination register of the register file 14. As for a normal load instruction other than unaligned load instructions, the data merge unit 810 stores a returned data from the data cache 23 to the register file 14.

In a conventional microprocessor 8 employing a non-blocking load feature, even if a cache miss is generated when executing a normal load instruction other than an unaligned load instruction, it is possible to access to a data cache by saving the instruction in a fetch queue 109 and executing subsequent load instructions while refilling the data cache.

However it has now been discovered that there still is a problem that a pipeline stall can be generated even with a non-blocking load feature if an instruction to be executed is an unaligned load instruction. The pipeline stall occurs even on a cache hit, not only when an unaligned instruction encounters a cache miss, loading from a main memory, or performing an uncached load.

As described in the foregoing, when executing an unaligned load instruction such as LWL and LWR instruction, content stored to a load destination register before executing the unaligned load instruction must be stored to the Top register 103 and retained there until the data merge unit 810 refers to merging data. Executing an unaligned load instruction usually requires two or more cycles to retrieve a returned data from the data cache 23, even on a cache hit. Therefore, until data is retrieved from the data cache 23, a conflict for the Top register 103 is generated between the unaligned load instruction and the subsequent instructions, consequently blocking an execution of the subsequent instructions. On a cache miss or a uncache load, longer pipeline stall could be generated. As stated above, even with a fetch queue 109 for non-blocking load, executing an unaligned load instruction prevents from continuing non-blocking operation and eventually generates a pipeline stall.

For this reason, an aforementioned conventional microprocessor 8 is configured in a way that when an unaligned instruction evaluation unit 804 acknowledges that an unaligned load instruction is issued, the unaligned instruction evaluation unit 8 outputs busy signals to the instruction decode unit 13 and the reservation station 18 aside from a status of the fetch queue 109 in order to block executions of subsequent instructions.

SUMMARY OF THE INVENTION

According to an aspect of the present invention, there is provided a microprocessor that includes a instruction issue unit for issuing a load instruction, a load unit for reading data from a data cache to a load destination register according to the load instruction issued from the instruction issue unit, for performing a non-blocking load. The load unit comprises a first input register for storing a value stored in the load destination register before being loaded, and a saved register capable of storing data retained in the first input register. In a case if the load instruction issued from the instruction issue unit is an unaligned load instruction for storing data, which is created by merging the data read from the memory with the value before being loaded, in the load destination register, the microprocessor according to the present invention stores the data stored in the first input register in the saved register, so that the first input register can be available to subsequent load instructions issued from the instruction issue unit.

With such a configuration, a resource conflict for the first input register between the unaligned load instruction and subsequent instructions can be prevented from being generated, because the first input register that stores a value before loading a load destination register can be available to the subsequent instructions. Thus avoiding a pipeline stall generation on an execution of an unaligned load instruction is achieved with irrespective of a cache miss occurrence or an execution of an uncached load.

According to another aspect of the present invention, there is provided a control method of a microprocessor that includes a instruction issue unit for issuing a load instruction, a load unit for reading data from a data cache to a load destination register according to the load instruction issued from the instruction issue unit, for performing a non-blocking load. The method begins with evaluating a load instruction issued from the instruction issue unit whether it is an unaligned load instruction for storing a data, which is created by merging the data read from the data cache with a value before loading the load destination register, in the load destination register. If the load instruction is evaluated as an unaligned load instruction, the control method then stores the value in the load destination register before being loaded, which is stored in an first input register of the load unit, in a saved register and makes the first input register available to subsequent instructions issued by the instruction issue unit.

With such a control method, a resource conflict for the first input register between an unaligned load instruction and subsequent instructions can be prevented from being generated, because the first input register, which stores a value in a load destination register before being loaded, can be available to the subsequent instructions. Thus avoiding a pipeline stall generation on an execution of an unaligned load instruction is achieved with irrespective of a cache miss occurrence or an execution of an uncached load.

This invention provides a microprocessor and a control method thereof that allows to avoid a generation of a pipeline stall on an execution of an unaligned load instruction.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
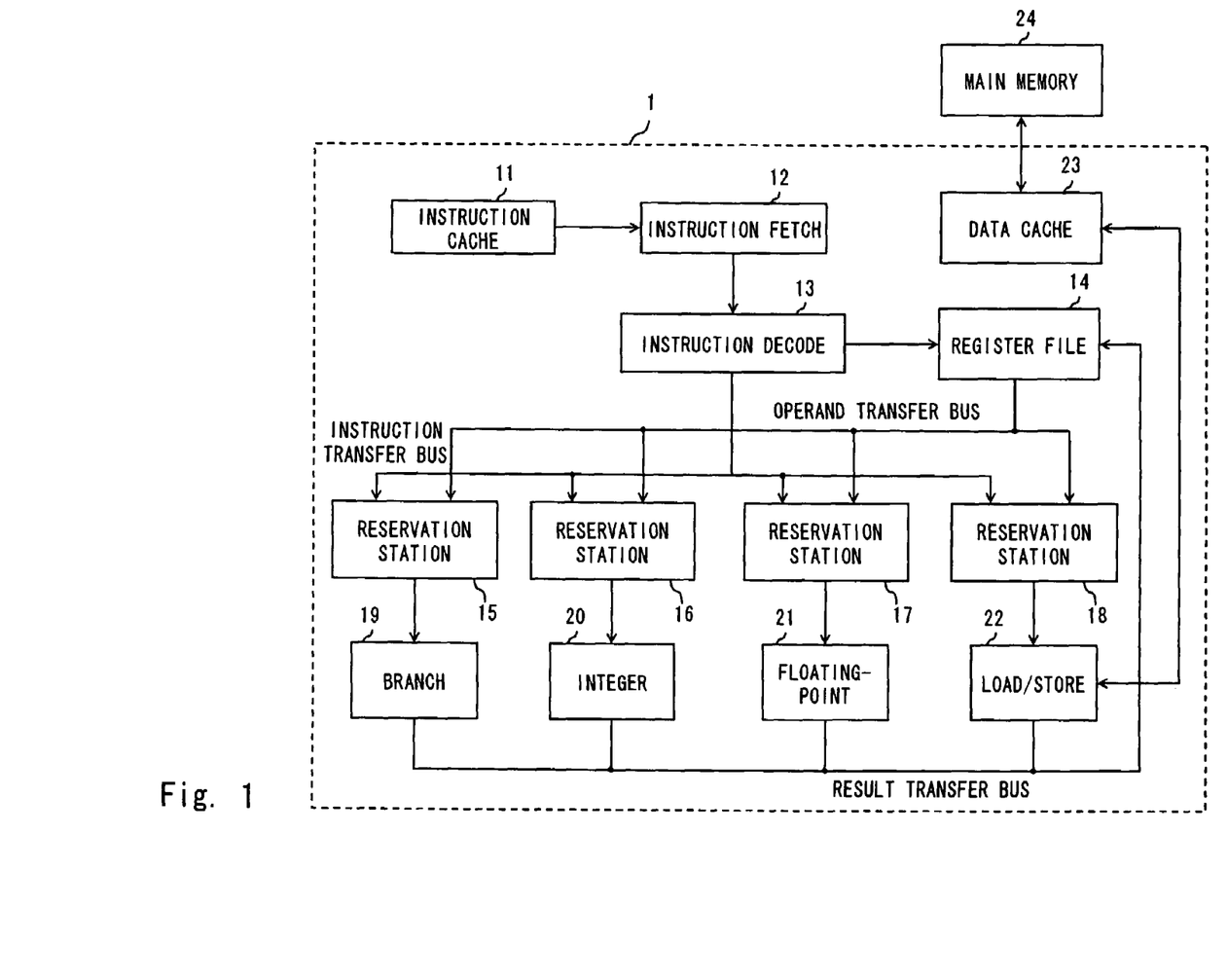
FIG. 1 is a block diagram of a microprocessor according to the present invention.

A configuration of a microprocessor 1 of this embodiment is described hereinafter with reference to FIGS. 1 and 2. FIG. 1 is a view showing an overall configuration of the microprocessor 1. Microprocessor 1 is characterized in that it comprises a load/store unit (LSU) 22 for avoiding a generation of pipeline stall in case of a cache miss occurred while executing an unaligned load instruction. In FIG. 1, constituents other than the load/store unit 22 are identical to the constituents of the microprocessor 8 shown in FIG. 8, accordingly they are denoted by reference numerals identical to those therein with detailed description omitted.

Figure 2:
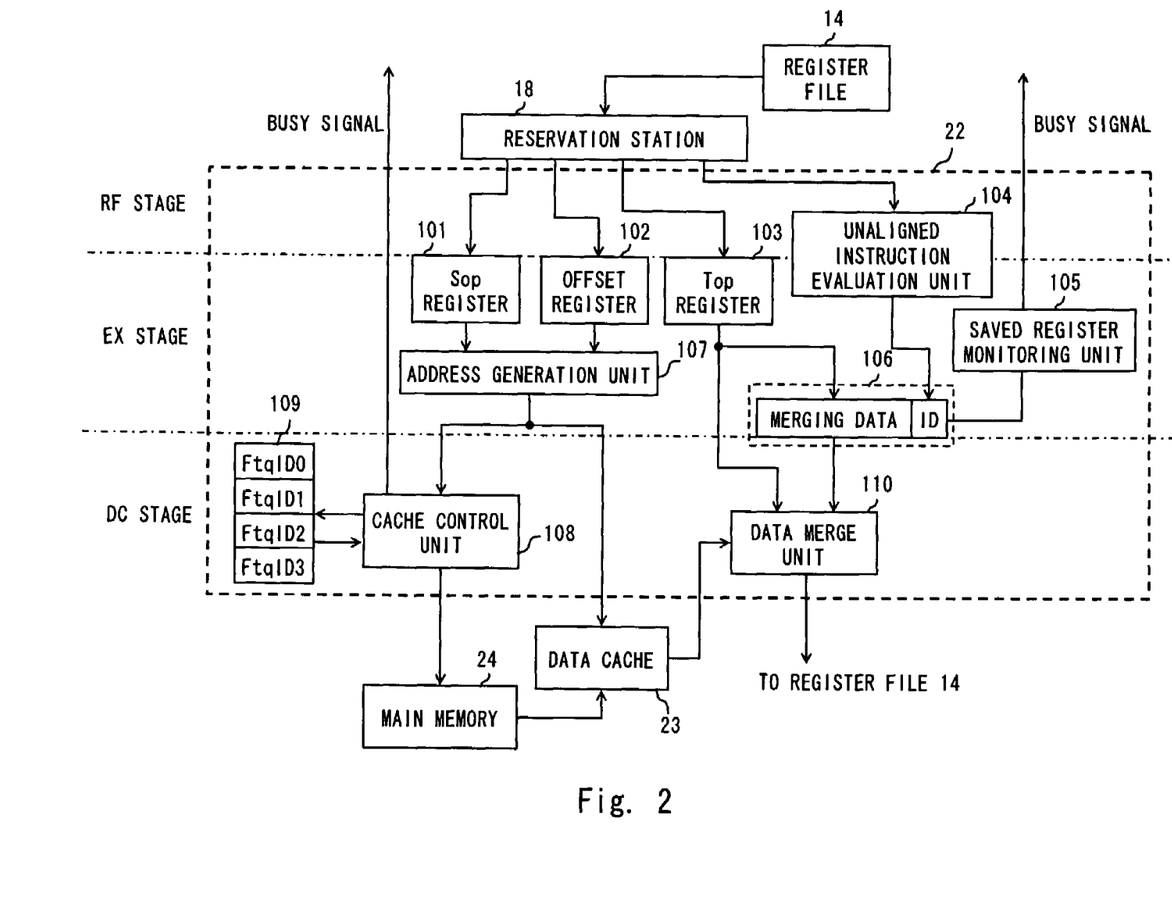
FIG. 2 is a block diagram of load/store unit that is included in a microprocessor according to the present invention.

FIG. 2 is a view showing a configuration of the LSU 22 included in the microprocessor 1. The LSU 22 includes a saved register 106 and a saved register monitoring unit 105. When a unaligned instruction evaluation unit 104 acknowledges that an unaligned load instruction is issued, a merging data set to the Top register 103 is stored to the saved register 106.

If a new unaligned load instruction is issued to the LSU 22 while the saved register 106 is still in use, a pipeline stall is generated. Thus the saved register monitoring unit 105 monitors availability of the saved register 106, and if the saved register 106 is in use, the saved register monitoring unit 105 outputs busy signals to the instruction decoding unit 13 and the reservation station 18 so as to stop issuing a new unaligned load instruction. When a new merging data can be stored to the saved register 106, it aborts outputting the busy signals.

In a case of an unaligned load instruction, the data merge unit 110 merges a returned data from the data cache 23 with merging data stored to the saved register 105, and stores the merged data in a load destination register of the register file 14. In a case of a normal instruction other than an unaligned load instruction, the data merge unit 110 stores the returned data from the data cache 23 in the register file 14.

Figure 3:
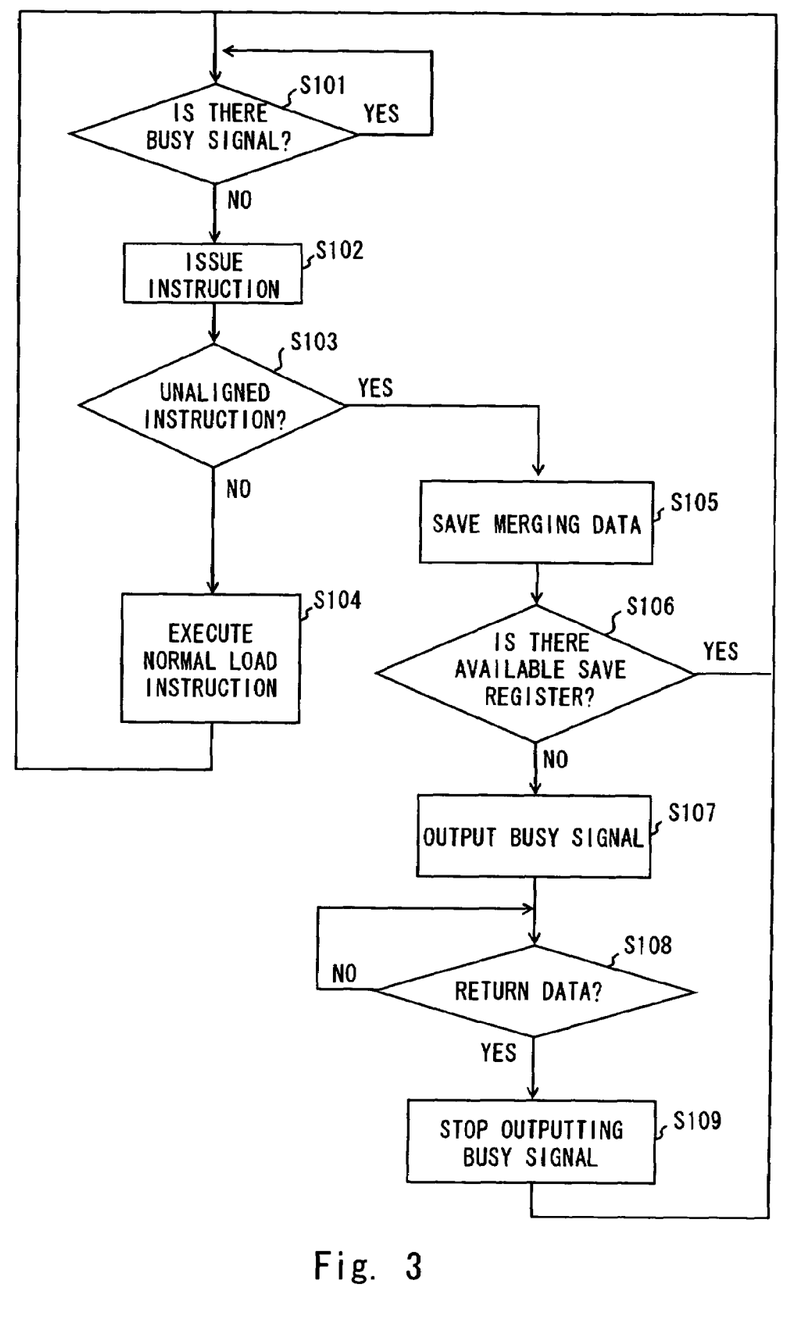
FIG. 3 is a flow chart showing a procedure of a load instruction for a microprocessor according to the present invention.

A load instruction execution procedure of the microprocessor 1 is described hereinafter with reference to a flow chart shown in FIG. 3. If there is no busy signal, a load instruction is issued from the instruction decode unit 13 and the reservation station 18 to the LSU 22 (step S101 and S102). At a step S103, the unaligned instruction evaluation unit 104 evaluates whether the issued instruction is an unaligned load instruction. If it is not an unaligned load instruction, the unaligned instruction evaluation unit 104 executes the normal load instruction in a similar manner as a conventional microprocessor (step S104). If it is an unaligned load instruction, the unaligned instruction evaluation unit 104 stores merging data which is set to the Top register 103 in the saved register 106 (step S105). If there is free space in the saved register 106, the saved register monitoring unit 105 returns to S101 and accepts a new instruction (step S106).

If there is no free space in the saved register 106 and a new merging data cannot be stored, the saved register monitoring unit 105 outputs a busy signal (step S106 and S107) When a data is retrieved from the data cache 23, outputs of busy signals are aborted (step S108 and S109). The data merge unit 110 merges the merging data stored in the saved register 106 with a returned data from the data cache 23, and then stores the merged data in the register file 14.

As described in the foregoing, in the microprocessor 1, merging data used to merge data for executing an unaligned load instruction is stored in the saved register 106. Thus a resource confliction for the unaligned load instruction and subsequent load instructions does not occur on an execution of the unaligned load instruction. This prevents a pipeline stall from being generated on an execution of an unaligned load instruction, enabling to continue executing subsequent instructions.

Figure 4A:
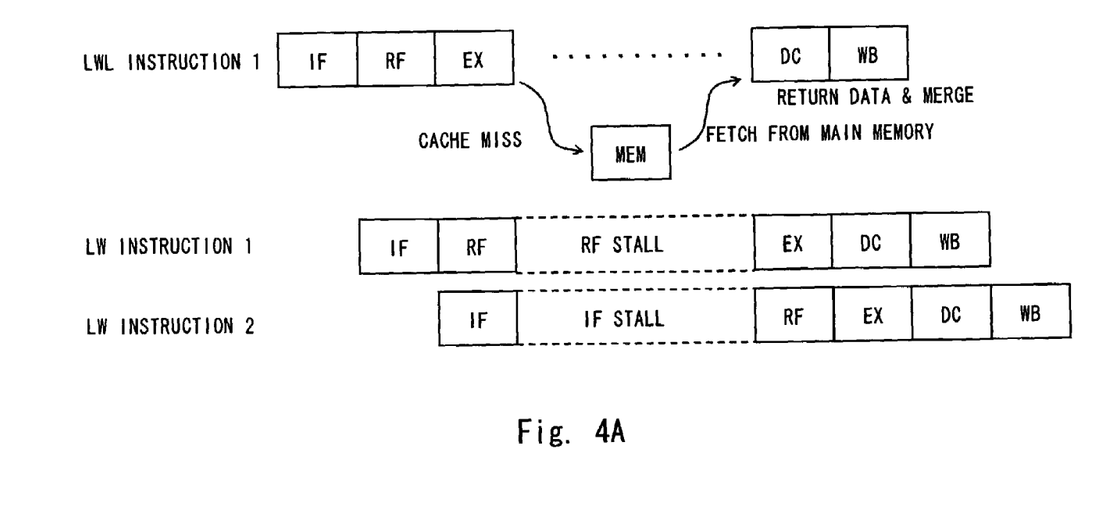
FIGS. 4A and 4B are views explaining a pipeline process in a microprocessor according to the present invention.
Figure 4B:
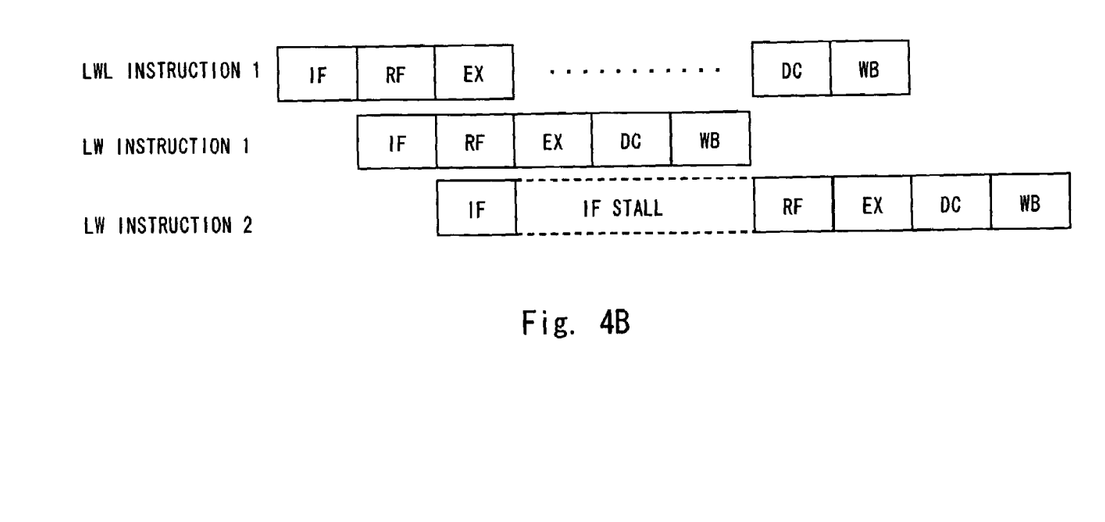

A pipeline process in the microprocessor 1 is described hereinafter in detail with reference to FIGS. 4A and 4B. FIG. 4A shows a pipeline process of a conventional microprocessor 8, while FIG. 4B shows a pipeline process of the microprocessor 1 of this embodiment. "IF" in FIGS. 4A and 4B indicates an instruction fetch stage, "RF" indicates an instruction decode stage including a fetch of an operand register, and "EX" indicates an execution stage. "DC" is a stage for accessing to the data cache 23, while "WB" is a stage for performing a write back, which is to store a returned data from the data cache 23 in the register file 14.

As shown in FIG. 4A, if a LWL instruction 1 encounters a cache miss in a conventional microprocessor 8, data must be retrieved from the main memory 24, not from the data cache 23. MEM stage in FIG. 4A represents a stage for retrieving data from the main memory. If an unaligned load instruction encounters a cache miss in the conventional microprocessor 8, all load instructions including normal load instructions are stopped from being issued. In a case of FIG. 4A, a pipeline stall is generated in a normal load instruction (i.e., LW instruction 1 and LW instruction 2) that follows the LWL instruction 1.

On the other hand in the microprocessor 1 of this embodiment shown in FIG. 4B, even when a LWL instruction 1 encounters a cache miss, a subsequent LW instruction 1 will not be stalled. In a configuration where the saved register 106 is capable of saving merging data for one instruction, a LWL instruction 2 could be stalled during its executing that follows the LWL instruction 1 and the LW instruction 1.

By providing the saved register 106 capable of storing at least one merging data for an unaligned load instruction in the way described above, it is possible to avoid generating a pipeline stall in subsequent normal load instructions. By making the saved register 106 to be able to save merging data for a plurality of unaligned load instructions, pipeline stall can be avoided even in a case when a plurality of unaligned load instructions are continuously issued. In such a case, a merging data should be mapped with an instruction ID for identifying an unaligned load instruction before being stored in the saved register 106.

Second Embodiment

A difference of a microprocessor of this embodiment from the microprocessor 1 of the previous embodiment is that a saved register to store merging data is made capable of storing merging data at least for the number of instructions that are saved in the fetch queue 109.

Figure 5:
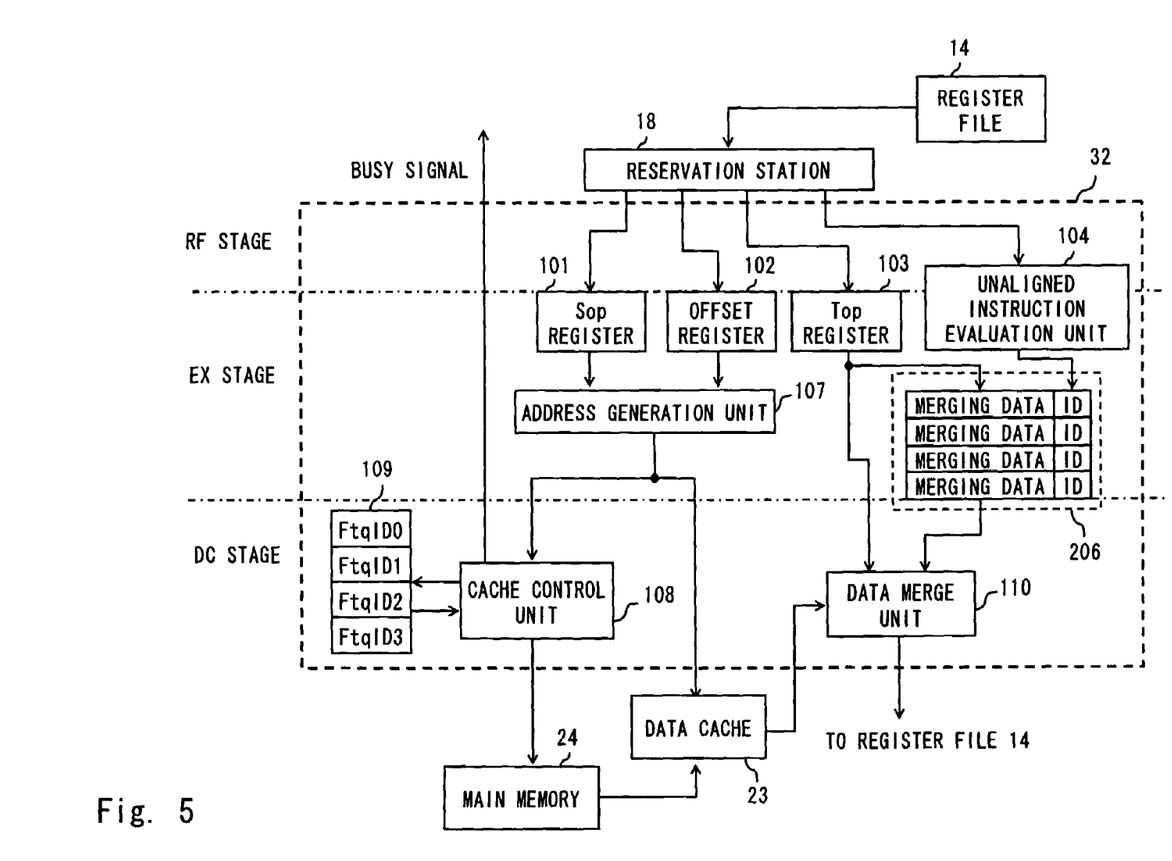
FIG. 5 is a block diagram of load/store unit included in a microprocessor according to the present invention.

A configuration of LSU 32 included in the microprocessor of this embodiment is shown in FIG. 5. In FIG. 5, constituents other than the LSU32 are identical to the constituents of the microprocessor 1 of the first embodiment, accordingly a drawing to show an overall configuration of a microprocessor and its descriptions are omitted.

The saved register 206 included in the LSU 32 is capable of storing merging data for the same number the fetch queue 109 can save. In FIG. 5, the number of storable merging data is for 4 instructions.

Figure 6:
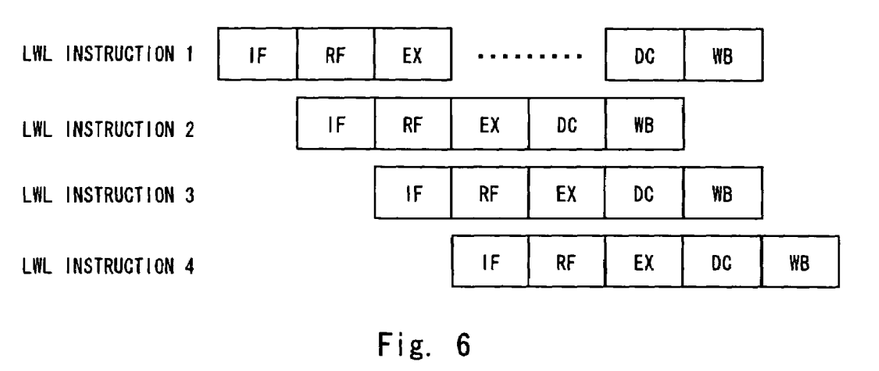
FIG. 6 is a view explaining a pipeline process in a microprocessor according to the present invention.

Such a configuration enables the saved register 206 to save merging data even in a case when as many unaligned load instructions as storable in a fetch queue are issued. For example even if the number of instructions possible to be saved in the fetch queue is 4 instructions and there are 4 unaligned load instructions stacked as shown in FIG. 6, these instructions can be executed without generating a pipeline stall. As described here, the microprocessor of this embodiment is capable of executing an unaligned load instruction in the same cycle when executing a normal load instruction.

Further in this embodiment, a trigger to an occurrence of a pipeline stall in a load instruction is when unaligned load instructions are issued exceeding the number of instructions that can be saved in the fetch queue 109. This means consecutive unaligned load instructions are not the root cause of a pipeline stall. LSU 32 shown in FIG. 5 is therefore only needs to output or stop outputting busy signals depending on a status of the fetch queue 109, and does not require a condition monitoring peculiar to the saved register 206. This is how the LSU32 is able to forgo the saved register monitoring unit 105 that is included in the LSU 22 of the first embodiment. This simplifies a configuration of an LSU, thereby facilitating microprocessor designing.

In the saved register 206, merging data may be saved mapping with a FtqID and an instruction ID that identify an instruction stored in the fetch queue. The saved register 206 and the fetch queue 109 can be integrated to save merging data mapped with a FtqID and an instruction ID therein. In this way, the saved register 206 can easily be included only by extending the fetch queue 109 that is conventionally been used. It also saves an area on a microprocessor needed to place the saved register 206.

In the first and the second embodiments, the unaligned load instruction evaluation unit 104 is to be included in the load/store units 22 and 32. However an evaluation of a load instruction issued to the load/store units 22 and 23 is not necessarily needed to be carried out in the load/store units 22 and 32, but it may be configured in a way where an evaluation result is inputted to load/store units 22 and 32.

It is apparent that the present invention is not limited to the above embodiment and it may be modified and changed without departing from the scope and spirit of the invention.

What is claimed is:

1. A microprocessor executing an unaligned load instructions and another load instruction, said another load instruction being subsequent instruction to the unaligned load instruction, the microproccessor comprising:
    a memory including a plurality of data lines;
    an input register storing data included in data lines;
    a saved register capable of storing the data from the input register;
    an evaluation unit determinig whether an instruction to be executed is the unaligned load instruction or not, the saved register being coupled to the input register to receive the data when the evaluation unit determines the instruction to be executed is the unaligned load instruction; and
    a merge unit coupled to the memory and to the saved register to merge the data with other data stored in the memoery when the instruction to be executed is the unaligned load instruction,
    wherein the merge unit merges the data with the other data after an access to the memory for said another load instruction,and
    wherein when the evaluation unit determines that the instruction to be executed is the unaligned load instruction, the evaluation unit saves the data stored in the input register to the saved register so as to make the input register available to subsequent instructions.

2. The microprocessor according to claim 1, further comprising:
    an instruction issue unit issuing an instruction; and
    a monitoring unit directing the instruction issue unit to stop issuing a new instruction when there is no free space to store new data in the saved register.

3. The microprocessor according to claim 1, wherein the saved register stores the data and further data included in the plurality of data lines of the memory.

4. The microprocessor according to claim 1, wherein the memory comprises a data cache provided between a main memory that resides outside the microprocessor and the microprocessor,
    the microprocessor further comprises:
        a fetch queue saving an instruction that has encountered a cache miss on an access to the dat cache,
        wherein a capacity of the saved register is equal to or less than a capacity of the fetch queue.

5. A microprocessor executing an unaligned load instruction and another load instruction, said another load instruction being a subsequent load instruction to the unaligned load instruction, the microprocessor comprising:
    a memory including a plurality of data lines;
    a first input register storing data included in the data lines;
    a second input register storing information for generating an effective address of the memory;

a saved register capable of storing the data from the first input register;

an evaluation unit determinig whether an instruction to be executed is the unaligned load instruction or not, the saved register being coupled to the first input register to receive the data when the evaluation unit determines that the instruction to be executed is the unaligned load instruction;

an address generation unit generating an effective address according to the information stored in the second register; and a merge unit coupled to the memory and to the saved register to merge the data with other data stored in the memory when the instruction to be executed is the unaligned load instruction, wherein the merge unit merges the data with the other data after an access to the memory for said another load instruction, and wherein when the evaluation unit determines that the instruction to be executed is the unaligned load instruction, the evaluation unit saves the data stored in the first input register to the saved register so as to make the first input register available to subsequent instructions.

6. The microprocessor according to claim 5, further comprising an instruction issue unit issuing an instruction, wherein when the evaluation unit determines that the instruction to be executed is the unaligned load instruction, the evaluation unit saves the data stored in the first input register in the saved register so as to make the first input register available to subsequent instructions.

7. The microprocessor according to claim 5, further comprising:

an instruction unit issuing an instruction; and a monitoring unit directing the instruction issue unit to stop issuing a new instruction if there is no free space to store a new data in the saved register.

8. The microprocessor according to claim 5, wherein the saved register stores the data and further data included in the plurality of data lines of the memory.

9. The microprocessor according to claim 5, wherein the memory comprises a data cache provided between a main memory that resides outside the microprocessor and the microprocessor, the microprocessor further comprises a fetch queue saving an instruction that has encountered a cache miss on an access to the data cache, wherein the capacity of the saved register is equal to or less than a capacity of the fetch queue.

10. The microprocessor according to claim 1, wherein the another load instruction comprises a load instruction or another unaligned load instruction.

* * * * *